Patented Aug. 2, 1949

2,477,661

UNITED STATES PATENT OFFICE 2,477,661

DISAZO DIANISIDINE PIGMENTS

Sylvester A. Scully, River Edge Manor, N. J., assignor to Interchemical Corporation, New York, N. Y., a corporation of Ohio No Drawing. Application March 13, 1943, Serial No. 479,107

2 Claims. (Cl. 260—181)

This invention relates to the blue pigment prepared by coupling tetrazotized dianisidine with the 2:5 dimethoxy anilide of beta oxy naphthoic acid, and to its coppered derivative, and provides for the first time a weather-resistant blue pigment which has reflectance characteristics essentially similar to that of chlorophyll in the near infra-red region of the spectrum.

It is known that grass, leaves and foliage in general reflect a large proportion of energy in the infra-red region in addition to the visible light, and this is true even when the vegetation has lost its characteristic green color, or was naturally of a different shade. The increasing use of infra-red photography in military reconnaissance makes it necessary to employ paints for camouflage which have substantially the same spectral reflectance throughout the entire visible spectrum and well into the infra-red region as has the foliage for which the paint is intended to be mistaken. Although some pigmented compositions will reflect infra-red energy to a greater extent than visible light, they are not necessarily suitable for camouflage because the spectral reflectance characteristics of vegetation are not only high in the infra-red region of the spectrum, but they show a peculiar, sharp absorption at the long wave end of the visible spectrum (i. e., 680 to 730 mu wave length).

It has been recognized that it would be most desirable for simulating vegetation to use a pigment blue which would be resistant to weathering, and would have spectral absorption characteristics which can be described as having a major transition from maximum light absorption to maximum transmittance occurring in the wave length region from about 680 to about 730 mu, a high degree of transmittance in the wave length region from about 740 to about 900 mu, the maximum absorption falling within the range of about 670 to about 690 mu, and showing increasing transmittance from the point of maximum absorption to about 450 mu.

I have produced a pigment characterized by the desired spectral absorption characteristics combined with unusually good resistance to weathering. This pigment is the product obtained by coupling tetrazotized dianisidine with the 2:5 dimethoxy anilide of beta oxy naphthoic acid. The coupled pigment may be used itself, although slightly better results are obtained with its coppered derivative.

The pigment may be made in any conventional manner. As a typical example, 12.2 pounds of dianisidine, 700 pounds of water, and 7.0 pounds of sodium nitrite are charged into a vat, and stirred for an hour. The temperature is reduced to 7° C. with ice, and 9⅛ pounds of hydrochloric acid (100% basis) are added; stirring is continued for about 45 minutes, to a positive test on starch-KI paper. Char is added, and the tetrazo solution filtered.

A coupling solution consisting of—

|  | Pounds |
|---|---|
| 2:5 dimethoxy anilide of beta oxy naphthoic acid | 32.50 |
| Water | 1922.00 |
| Sodium hydroxide | 4.80 |
| Soda ash | 38.11 |
| Aerosol O. T. (wetting agent) | 2.26 | is made by heating the anilide with the sodium hydroxide and 30 pounds of water to get a solution. The bulk of the water is then added, then the soda ash, and finally the wetting agent dissolved in a few pounds of water.

The cold tetrazo solution is then added over a period of 45–60° C. After stirring for two hours, the slurry is heated to 80° C., and the pigment washed alkali-free. An excellent blue pigment is obtained by this method, having the desired light-resistance and reflectance characteristics.

The blue pigment prepared as above may be reslurried with 1922 pounds of water, and heated to 60° C. It is struck with the following solution:

|  | Pounds |
|---|---|
| Blue vitriol | 75 |
| dissolved in |  |
| Water, at 60° C. | 200 |
| Commercial ammonium hydroxide | 127 |

Stir until complete solution is obtained. The ammonium hydroxide first precipitates and then dissolves the copper salt. Heat pigment slurry containing the ammoniacal copper sulfate solution to near boil for 1.5 hours. Filter and wash alkali-free.

The copper pigment is somewhat more light-resistant than the uncoppered color.

Obviously, the conventional manufacturing methods above described can be replaced by other similar methods.

I claim:

1. The pigment dyestuff obtained by coupling tetrazotized dianisidine with the 2:5 dimethoxy anilide of beta oxy naphthoic acid, the pigment being characterized by its resistance to fading by sunlight, and by its spectral absorption which is characterized by having a major transition from maximum light absorption to maximum transmittance occurring in the wave length region from about 680 to about 730 mu, a high degree of transmittance in the wave length region from about 740 to about 900 mu, the maximum absorption falling within the range of about 670 to about 690 mu and showing increasing transmittance from the point of maximum absorption to about 450 mu.

2. The pigment dyestuff obtained by coppering the product of the coupling of tetrazotized dianisidine with the 2:5 dimethoxy anilide of beta oxy naphthoic acid, the pigment being characterized by its resistance to fading by sunlight, and by its spectral absorption which is characterized by having a major transition from maximum light absorption to maximum transmittance occurring in the wave length region from about 680 to about 730 mu, a high degree of transmittance in the wave length region from about 740 to about 900 mu, the maximum absorption falling within the range of about 670 to about 690 mu and showing increasing transmittance from the point of maximum absorption to about 450 mu.

SYLVESTER A. SCULLY.

REFERENCES CITED

The following references are of record in the file of this patent:

UNITED STATES PATENTS

| Number | Name | Date |
|---|---|---|
| Re. 19,527 | Laska et al. | Apr. 9, 1935 |
| 1,042,356 | Laska et al. | Oct. 22, 1912 |
| 1,838,229 | Laska et al. | Dec. 29, 1931 |
| 1,882,560 | Glietenberg et al. | Oct. 11, 1932 |
| 1,921,361 | Laska et al. | Aug. 8, 1933 |
| 2,361,473 | Granville | Oct. 31, 1944 |